United States Patent [19]

Lipp

[11] Patent Number: 5,393,586
[45] Date of Patent: Feb. 28, 1995

[54] LOCALIZED ELECTRICAL HEATING OF HONEYCOMB STRUCTURES

[75] Inventor: G. Daniel Lipp, Painted Post, N.Y.

[73] Assignee: Corning Incorporated, Corning, N.Y.

[21] Appl. No.: 967,183

[22] Filed: Oct. 27, 1992

[51] Int. Cl.6 .................................. B32B 3/12
[52] U.S. Cl. ..................... 428/116; 219/552; 392/485
[58] Field of Search .............. 428/116; 219/552; 392/485

[56] References Cited

U.S. PATENT DOCUMENTS

| | | | |
|---|---|---|---|
| 3,112,184 | 11/1963 | Hollenbach | 428/116 X |
| 3,208,131 | 9/1965 | Ruff et al. | 29/890 |
| 3,444,925 | 5/1969 | Johnson | 428/116 X |
| 3,790,654 | 2/1974 | Bagley | 428/116 X |
| 3,889,464 | 6/1975 | Gardner | 60/286 |
| 3,956,614 | 5/1976 | Hervert | 219/541 |
| 3,963,504 | 6/1976 | Lundsager | 428/116 X |
| 3,992,330 | 11/1976 | Noakes et al. | 502/527 X |
| 3,995,143 | 11/1976 | Hervert | 428/116 X |
| 4,283,207 | 8/1981 | Martyniuk | 55/282 |
| 4,293,357 | 10/1981 | Higuchi et al. | 428/116 X |
| 4,329,162 | 5/1982 | Pitcher, Jr. | 428/117 X |
| 4,505,726 | 3/1985 | Takeuchi et al. | 55/282 |
| 4,535,589 | 8/1985 | Yoshida et al. | 55/282 X |
| 4,662,911 | 5/1987 | Hirayama et al. | 55/282 |
| 4,717,813 | 1/1988 | Berg et al. | 219/541 |
| 4,758,272 | 7/1988 | Pierotti et al. | 75/246 |
| 4,813,231 | 3/1989 | Bykowski | 60/286 X |
| 4,990,181 | 2/1991 | Pierotti et al. | 75/246 |
| 5,063,029 | 11/1991 | Mizuno et al. | 55/DIG. 30 |
| 5,194,719 | 3/1993 | Merkel et al. | 219/552 |
| 5,202,547 | 4/1993 | Abe et al. | 428/116 X |
| 5,202,548 | 4/1993 | Kondo et al. | 428/116 X |
| 5,288,975 | 2/1994 | Kondo | 392/485 X |

FOREIGN PATENT DOCUMENTS

| | | |
|---|---|---|
| 502727 | 9/1992 | . |
| 2251631 | 5/1973 | Germany . |
| 3608801 | 9/1987 | Germany . |
| 54-160589 | 12/1979 | Japan ............ 55/282 |
| 57-110311 | 7/1982 | Japan . |
| 58-143815 | 8/1983 | Japan . |
| 58-143817 | 8/1983 | Japan ............ 55/282 |
| 2206130 | 12/1988 | United Kingdom . |
| 2247413 A | 3/1992 | United Kingdom . |
| WO89/10471 | 11/1989 | WIPO . |

OTHER PUBLICATIONS

Translation of 57-110,311 (Japan, Jul. 9, 1982), Item 18 above.
Translation of 58-143,815 (Japan, Aug. 26, 1983). Item 19 above.
Translation of 58-143,817 (Japan, Aug. 26, 1983), Item 20 above.
Translation of WO89/10471 (PCT, Nov. 2, 1989), Item 21 above.
Translation of 2,251,631 (Germany, May 10, 1973), Item 24 above.

*Primary Examiner*—Henry F. Epstein
*Attorney, Agent, or Firm*—Robert Carlson

[57] ABSTRACT

Electrically conductive honeycomb structures are provided which include an inlet face, an outlet face, a set of short insulating slots extending from the inlet face towards the outlet face, and a set of long insulating slots extending from the outlet face towards the inlet face. The short and long slots are interdigitated so that electrical current flowing parallel to the inlet face must follow a serpentine path around the ends of the slots. The serpentine path is located closer to the inlet face than to the outlet face so that the heating effect of the current is localized near the inlet face.

7 Claims, 1 Drawing Sheet

LOCALIZED ELECTRICAL HEATING OF HONEYCOMB STRUCTURES

BACKGROUND OF THE INVENTION

1. Field of the Invention

This invention relates to honeycomb structures and, in particular, to honeycomb structures which can be heated electrically.

2. Description of the Prior Art

Electrically heatable honeycomb structures of various configurations have been proposed in the art to serve as catalytic converters, preheaters for catalytic converters, and particulate filters.

For example, Japanese Patent Publication No. 57-110,311 discloses a filter for diesel exhaust gases formed by sealing off alternate cells on the two ends of a porous honeycomb. (See Pitcher, Jr., U.S. Pat. No. 4,329,162, for the basic structure of such a particulate filter.) The filter of the Japanese publication is composed of silicon carbide so that it is electrically conductive. Accumulated carbon particles are burned out of the filter by passing electrical current through the honeycomb in the direction of the longitudinal axis of the cells. Japanese Patent Publication No. 58-143,817 discloses a similar silicon carbide filter in which the current is passed through the honeycomb in a direction transverse to the cells' longitudinal axis rather than parallel to that axis.

Japanese Patent Publication No. 58-143,815 discloses another approach for using an electrical current to regenerate a particulate filter. In this case, the filter is made of a non-conductive, porous ceramic and has an accordion rather than a honeycomb configuration. Accumulated carbon particles are burned off of this filter by passing current through the carbon particles rather than through the filter material.

With regard to catalytic converters, Mizuno et al., U.S. Pat. No. 5,063,029, discloses a metal honeycomb which is electrically heated and serves as a preheater for a conventional catalytic converter. Slits are cut into the honeycomb and filled with an insulating adhesive to increase the honeycomb's resistance by causing the current to follow an elongated serpentine path. Along these same lines, PCT Patent Publication No. WO89/10471 discloses a catalyst support comprising an electrically conductive honeycomb in which a serpentine current path is used to increase the honeycomb's electrical resistance.

SUMMARY OF THE INVENTION

As the foregoing discussion of the prior art demonstrates, substantial efforts have been made to heat conductive honeycombs electrically and, in particular, proposals have been made to use serpentine conductive paths to increase the electrical resistance of a conductive honeycomb. These efforts and proposals, however, have been directed to bulk heating of honeycomb structures, not to localized heating.

In particular, the prior art has not provided a way to concentrate the heating effects of an electrical current along the inlet face of a honeycomb structure. Such concentrated heating allows for less overall power consumption especially in catalytic converter and particulate filter applications since once light-off is achieved in the region of the inlet face, the resulting exothermic reaction helps heat the rest of the honeycomb.

In view of this state of the art, it is an object of this invention to provide an electrically heatable honeycomb having a structure which results in a greater temperature rise in the region of the honeycomb's inlet face than in the region of its exit face. More generally, it is an object of the invention to provide an electrically heatable honeycomb in which the heating effects of an electrical current are concentrated near one of the honeycomb's faces.

To achieve these and other objects, the invention in accordance with certain of its aspects provides a honeycomb structure comprising:

(a) an electrically conductive honeycomb body having first and second faces and a plurality of cells within the body which extend between the faces;

(b) a first set of electrically non-conductive regions formed in the body and extending from the first face towards the second face; and (c) a second set of electrically non-conductive regions formed in the body and extending from the second face towards the first face;

wherein the electrically non-conductive regions of the first set extend into the body a shorter distance than the electrically non-conductive regions of the second set and wherein the first and second sets of electrically non-conductive regions are interdigitated.

By means of this structure, electrical current flowing in a direction substantially parallel to the first face follows a serpentine path around the non-conductive regions which is located closer to the first face than to the second face. This location of the serpentine path, in turn, causes the heating effect of the current to be localized in the region of the first face.

In certain preferred embodiments of the invention, the first and second faces are separated by a distance D, the electrically non-conductive regions of the first set extend from the first face towards the second face for a distance $d_1$; the electrically non-conductive regions of the second set extend from the second face towards the first face for a distance $d_2$; and (i) $d_1$ is less than D;

(ii) $d_2$ is less than D;

(iii) $d_1$ is less than $d_2$; and (iv) $d_1$ plus $d_2$ is greater than D.

In other preferred embodiments, the cells of the honeycomb body define a longitudinal axis, the first and second faces are at opposite ends of the longitudinal axis, and the electrically non-conductive regions of the first and second sets extend substantially parallel to the longitudinal axis.

In further preferred embodiments of the invention, the non-conductive regions comprise slots formed in the body which are filled with an electrically insulating material. When the honeycomb structure is used as a particulate filter, filling of the slots ensures that all gases passing through the honeycomb structure are filtered. Alternatively, the cells of the honeycomb which intersect the slots can be plugged so that there is no through path between the faces of the honeycomb in the region of the slots. In connection with these embodiments, the invention provides a honeycomb structure comprising:

(a) a body having first and second faces and a plurality of cells within the body which extend between the faces;

(b) at least one slot formed in the body and extending from the first face towards the second face; and (c) means for plugging those cells which intersect the at least one slot, said means being located in the region of the second face.

Electrically heatable honeycombs of the foregoing types can be used as supports for catalytic converters, preheaters for catalytic converters, particulate filters (e.g. diesel particulate filters), and in other applications for honeycomb structures now known or subsequently developed.

As used herein, the terms "honeycomb" or "honeycomb structure" refer to a body having a number of passages or cells therein partitioned by walls. The passages can have any cross-sectional shape, e.g., square, rectangular, triangular, hexagonal, etc. There is no limitation on dimensions, e.g., diameter, length, number of cells or thickness of cell walls in the honeycomb as these can vary according to the application.

The accompanying drawing, which is incorporated in and constitutes part of the specification, illustrates a preferred embodiment of the invention, and together with the description, serves to explain the principles of the invention. It is to be understood, of course, that both the drawing and the description are explanatory only and are not restrictive of the invention.

DESCRIPTION OF THE PREFERRED EMBODIMENTS

Figure 1:
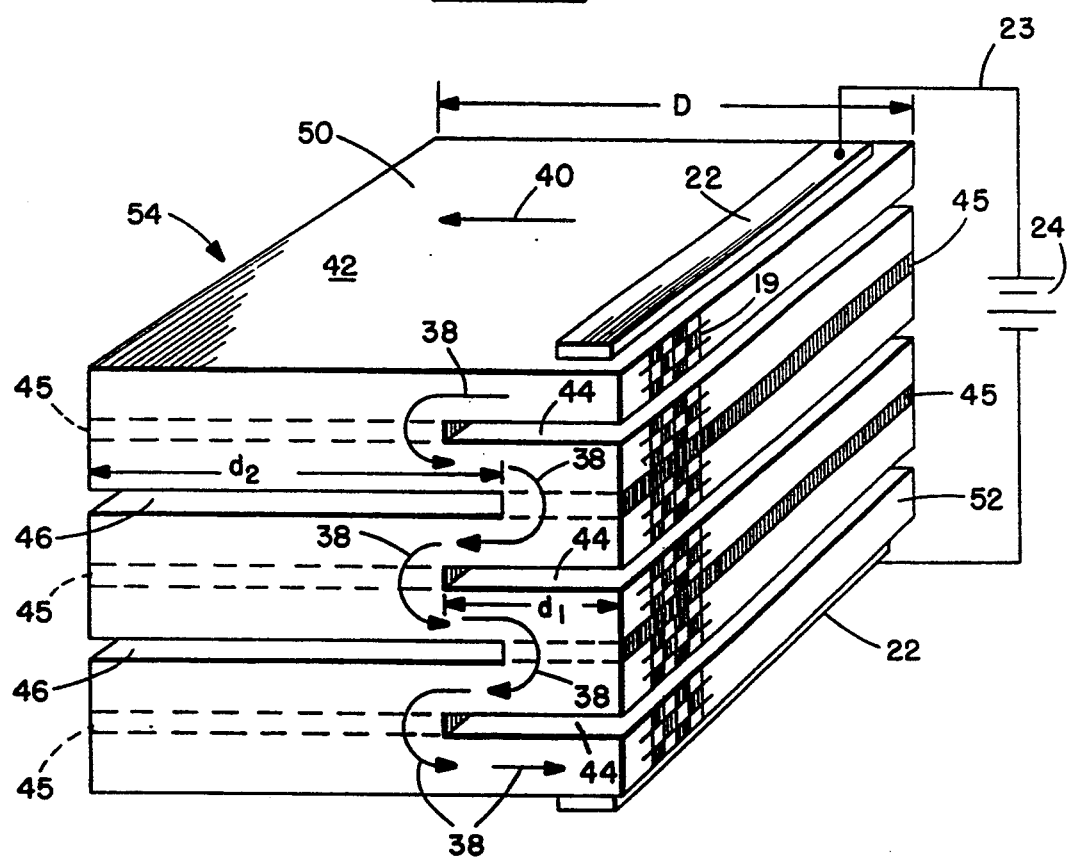
FIG. 1 is a partially schematic, perspective view of a honeycomb structure constructed in accordance with the invention.

FIG. 1 shows an electrically conductive honeycomb structure 42 having a set of short slots 44 of depth $d_1$ and a set of long slots 46 of depth $d_2$ extending into body 50 from faces 52 and 54, respectively. Faces 52 and 54 are separated by a distance D. Each of $d_1$ and $d_2$ are less than D, and the sum of $d_1$ and $d_2$ is greater than D so that the ends of slots 42 and 44 overlap as shown in FIG. 1.

Preferably, the electrical conductivity of the honeycomb is achieved by forming the body 50 out of an electrically conductive material. Suitable materials include alloys of the type disclosed in Pierotti et al., U.S. Pat. No. 4,758,272, U.S. Pat. No. 4,990,181, and in copending U.S. patent application Ser. No. 07/767,889 filed Sep. 30, 1991, the relevant portions of each of which are incorporated herein by reference.

The honeycomb body may also be formed of stainless steel or other high temperature resistant metals or alloys, e.g., alloys of and between aluminum, iron, nickel, titanium, niobium, chromium, cobalt, copper, silicon, molybdenum, tantalum, tungsten, yttrium, zirconium, and rare earth metals. Silicon carbide or a cermet may also be used. In general, any material which is electrically conductive and which exhibits high temperature resistance (e.g., can resist oxidation when heated) is suitable for the practice of the invention.

In addition to using honeycombs formed from conductive materials, body 50 can also be made of a non-conductive material and then coated with a layer of a conductive material such as a metal alloy which has a high temperature resistance. In general, however, the coating approach is not preferred because of the extra costs and labor involved in the coating process.

For heaters, the electrically conductive metal alloy or metallic composition is selected to provide suitable electrical resistance heating while electrical current is flowed through it.

The honeycomb body can be readily prepared using conventional fabricating techniques well-known in the art. For a sintered honeycomb body (more commonly having porous walls), the conventional techniques of plastically forming, drying, and firing can include those based on extrusion as in U.S. Pat. No. 3,790,654 and those based on assembling green or unfired sheets or strips as in U.S. Pat. Nos. 3,112,184, 3,444,925, and 3,963,504. The honeycomb body can also be formed of crimped foil, such as in U.S. Pat. Nos. 3,208,131 and 3,992,330, and in British Patent Application Publication GB 2206130A. Fabrication based on the extrusion technique is preferred.

As shown in FIG. 1, honeycomb 42 is designed to serve as a particulate filter and thus the ends of the cells are plugged in the manner described in Pitcher, Jr., U.S. Pat. No. 4,329,162, to form checkerboard pattern 19 in face 52. A complimentary checkerboard pattern is formed in face 54 so that gases which enter through unplugged ends in face 52 must pass through cell walls in order to exit through unplugged ends in face 54. In FIG. 1, the overall gas flow through the honeycomb is shown schematically by reference numeral 40.

In cases where the conductive honeycomb is used as a catalytic converter or a preheater for such a converter, plugging of alternate cells is not performed. Such a honeycomb for a converter or, if desired, a preheater can be provided, by conventional, otherwise known, or suitable means, with high surface area materials(s) as a single or multiple layer, coating or film on, and/or deposit in the pores of, the walls of the honeycomb. The high surface area material(s) can support catalyst material(s) provided thereon by conventional, otherwise known, or suitable means.

A saw, water jet or other cutting tool is used to form slots 44 and 46 in honeycomb body 50. When used as a particulate filter, the cells of the honeycomb which intersect slots 46 are plugged at face 52, while the cells which intersect slots 44 are plugged at face 54. This plugging is illustrated schematically in FIG. 1 by the reference numeral 45. In this way, slots 44 and 46 do not create a throughpath for gases between faces 52 and 54, i.e., gases cannot pass between these faces without passing through the walls of a honeycomb cell. The plugging of these cells is preferably performed at the same time checkerboard pattern 19 is formed, e.g., after firing of the honeycomb body, although it can be performed after the slotting has been completed, if desired.

Instead of plugging the cells which intersect slots 44 and 46, the slots can be filled with an electrically insulating material such as a mineral fiber mat or a non-conductive ceramic. In addition to preventing gases from flowing through the honeycomb without being filtered, such filler materials provide structural strength for the honeycomb. Accordingly, depending upon the application, they can be used even if the honeycomb is not intended for use as a filter. Preferably, the full depth of the slots is filled with the insulating material, although, if desired, only the portion of the slot in the region of the faces 52 and 54 need be filled.

Current is applied to honeycomb 42 by means of metal electrodes 22 which are applied to the surface of the honeycomb by, for example, soldering. Alternatively, the electrodes can be bonded to the honeycomb using a conductive frit or adhesive. An example of a suitable adhesive is Pyro-Duct 597, made by Aremco Products, Inc. of Ossining, N.Y. In the case of particulate filters, these same materials can be used to end plug the cells to form checkerboard pattern 19. Conductors 23 are attached to electrodes 22 and serve to carry electricity to the honeycomb from, for example, a storage battery 24. If desired, conductors 23 can be attached directly to the honeycomb without the use of intermediate electrodes.

It should be noted that although direct current is normally used to heat the honeycomb, especially in automotive applications, alternating current can be used if desired. Also, to avoid overheating of the honeycomb, it is desirable to monitor the honeycomb's temperature as the heating takes place using, for example, one or more thermocouples and to cut back on the amount of current supplied to the honeycomb once a desired temperature level has been reached. This is particularly advantageous in the case of diesel particulate filters since the oxidation of accumulated carbon particles is exothermic and thus is generally self-sustaining once ignition has been achieved.

Electrical heating of the honeycomb can be performed continuously or intermittently depending upon the application. In the case of the regeneration of diesel particulate filters, the heating can be performed while the honeycomb is carrying out its filtering action, or while it is in a bypass mode and another identical filter, in parallel, is actively filtering the exhaust gas, thereby permitting continuous operation of the diesel engine whose exhaust fumes are to be purged of carbon particles.

Since the sum of the depths of slots 44 and 46 are greater than the distance between faces 52 and 54, current flows through honeycomb 42 along the serpentine path shown by reference numeral 38 in FIG. 1. This path lies closer to face 52 than face 54 and thus the heating effect of the current is concentrated in the region of face 52. As discussed above, this effect is especially useful in catalytic converter and particulate filter applications since once light-off is achieved in the region of face 52, the resulting exothermic reaction can be used to heat the remainder of the honeycomb. In particular, continued gas flow through the filter will carry the heat generated in the region of face 52 to downstream portions of the honeycomb thus bringing them to operating temperature. Although the serpentine path as shown in FIG. 1 includes five reversals of the direction of the current, it is to be understood that in practice more or less reversals of the current path can be used to provide the desired electrical resistance for the overall honeycomb.

EXAMPLE

A honeycomb structure was prepared in accordance with the invention as follows.

A honeycomb having 100 square cells per square inch and 0.017 inch thick walls was prepared by extruding and sintering an iron/aluminum alloy. The composition of the alloy was 23 wt % aluminum and 77 wt % iron, which is about 50/50 on a mol % basis. The major dimensions of the honeycomb were approximately those of a three inch cube.

Slots were cut into the honeycomb on every fifth row of cells with two cuts from the downstream face two and one half inches deep (one half inch from the upstream face) interdigitated with three cuts from the upstream face which were one inch deep. Brass electrodes were attached to the honeycomb using silver solder.

Power was applied to the honeycomb at a voltage of 1.4 volts AC and a current of 300 amperes. The applied power resulted in localized heating of the honeycomb so as to produce red heat near the honeycomb's upstream face.

Although specific embodiments of the invention have been described and illustrated, it is to be understood that modifications can be made without departing from the invention's spirit and scope. For example, the honeycomb structure need not have a rectangular cross-section, but can be round, elliptical, hexagonal, or the like. Similarly, rather than forming straight slots in the body, the non-conductive regions can be curved or angular or can have other configurations depending upon the application.

The following claims are intended to cover the specific embodiments set forth herein as well as the modifications, variations, and equivalents which will be evident to persons skilled in the art.

What is claimed is:

1. A honeycomb structure comprising:
   (a) an electrically conductive honeycomb body having first and second faces and a plurality of cells within the body which extend between the faces;
   (b) a first set of electrically non-conductive regions formed in the body and extending from the first face towards the second face; and
   (c) a second set of electrically non-conductive regions formed in the body and extending from the second face towards the first face;
   wherein the electrically non-conductive regions of the first set extend into the body a shorter distance than the electrically non-conductive regions of the second set and wherein the first and second sets of electrically non-conductive regions are interdigitated.

2. The honeycomb structure of claim 1 wherein the first and second faces are separated by a distance D, the electrically non-conductive regions of the first set extend from the first face towards the second face for a distance $d_1$; the electrically non-conductive regions of the second set extend from the second face towards the first face for a distance $d_2$; and
   (i) $d_1$ is less than D;
   (ii) $d_2$ is less than D;
   (iii) $d_1$ is less than $d_2$; and
   (iv) $d_1$ plus $d_2$ is greater than D.

3. The honeycomb structure of claim 1 wherein the cells of the honeycomb body define a longitudinal axis, the first and second faces are at opposite ends of the longitudinal axis, and the electrically non-conductive regions of the first and second sets extend substantially parallel to the longitudinal axis.

4. The honeycomb structure of claim 1 wherein the electrically non-conductive regions are slots formed in the honeycomb body.

5. The honeycomb structure of claim 4 wherein the cells of the honeycomb which intersect the slots are plugged.

6. The honeycomb structure of claim 4 wherein the slots are filled with an electrically insulating material.

7. The honeycomb structure of claim 1 wherein the first face is the honeycomb's inlet face.

* * * * *